April 14, 1964 R. ANLIOT 3,129,075

SEPARATION METHOD AND APPARATUS

Filed Sept. 17, 1959

INVENTOR.
Robert Anliot
BY John L. Wiegreffe
ATTY.

United States Patent Office 3,129,075
Patented Apr. 14, 1964

3,129,075
SEPARATION METHOD AND APPARATUS
Robert Anliot, Wheaton, Ill., assignor to Admiral Corporation, Chicago, Ill., a corporation of Delaware
Filed Sept. 17, 1959, Ser. No. 840,746
5 Claims. (Cl. 55—17)

This invention relates to a method and apparatus for separating material and, in particular, for separating a fluid from a mixture of said fluid and other matter of fluid or solid, particulate form. It is an object of the invention to provide an improved method and apparatus of this character.

The method and apparatus of the present invention may be employed, for example, to separate a gas from solid, particulate matter. In such an application, a substantial percentage of clean gas may be separated in a single step from another substantial share of the original gas carrying substantially all of the solid, particulate matter therewith. This latter portion of the gas may be re-treated to extract an additional share of clean gas and thereby to reduce further the quantity of gas carrying the solid, particulate matter. The invention of this application, as well as in all other applications thereof, has the advantage of requiring no moving parts. It has the further advantages of extreme simplicity of construction, and small size. Still further, it operates as a continuous rather than a batch process, and it is effective even though the solid, particulate matter is extremely small in size.

The invention is also applicable to the separation of gases of different molecular weights. In such an application, the invention in its simplest form may have what might be regarded as only a small sparating effect. Even in this case, however, the invention can be of great value, as is explained in detail below. In a modified form, the invention may have a very substantial separating effect.

Other applications of the invention will be apparent to those skilled in the art.

The invention contemplates the uses of a vortex tube, also known variously as a Ranque tube, Hilsch tube, vortex refrigerator, T-tube, separator tube and Ranque-Hilsch tube. Such a tube is well known in the art and has been the subject of extensive study as a refrigerator or heating device, which converts a stream of air or other gas to two streams, one hot and one cold, or, as hereinafter referred to, a heat pumping means. In the separation of a gas from solid, particulate foreign matter, the vortex tube may be employed in a relatively conventional manner, even though the solid, particulate matter may be extremely small in size. In the separation of two gases it is desirable that very high velocities be maintained within the vortex, preferably on the order of 100 miles per hour or several hundred miles per hour. In accordance with one modification of the invention, referred to above, the incoming stream of mixed gases is cooled to a temperature above, but sufficiently close to, the boiling temperature of the heavier gas, that any of the heavier gas which is near the center of the vortex is caused by the heat transfer effect of the vortex tube to condense and to be thrown to the outer portion of the vortex. In accordance with this modification of the invention, both the centrifuging effect and the heat pumping effect of the vortex tube are employed, in combination, to effect separation of gases. Various other modifications of the invention serve to increase the effectiveness of the basic apparatus and/or otherwise to enhance the operation and effect of the basic invention.

Accordingly, it is another object of the invention to provide an improved method and apparatus for separating a gas from solid, particulate matter.

It is a further object of the invention to provide an improved method and apparatus for separating gases of different molecular weights.

It is a still further object of the invention to provide an improved method and apparatus for separating gases of different molecular weights, which method and apparatus employ both the centrifuging effect and the heat pumping effect of a vortex tube.

Another object of the invention is to provide an improved method and apparatus for separating a fluid from a mixture of said fluid and other matter of fluid or solid, particulate form, which method and apparatus may operate in a continuous process and require no moving parts.

Still another object of the invention is to provide an improved method and apparatus having various of the characteristics specified above while being inherently reliable, effective and inexpensive.

Further features of the invention pertain to the particular arrangement of the elements and steps of the separation method and apparatus, whereby the above outlined and additional features thereof are attained.

The invention, both as to its organization and method of operation, together with further objects and advantages thereof, will best be understood by reference to the following specification, taken in connection with the accompanying drawing, in which.

Figure 1:
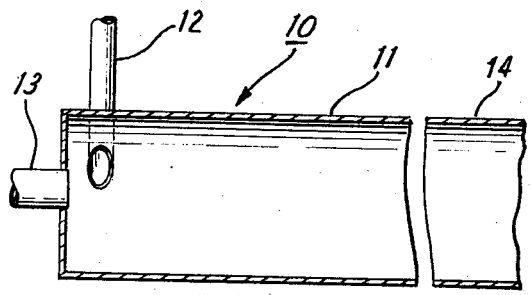
FIGURE 1 is a cross-sectional view of a vortex tube such as may be employed in accordance with the present invention.
Figure 2:
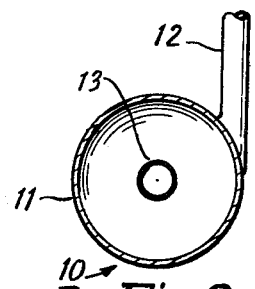
FIGURE 2 is a cross-sectional view taken along the line 2—2 of FIG. 1.

The vortex tube 10 illustrated in FIG. 1 is of conventional design. It includes the tube proper 11, an inlet conduit 12, a "cold" exhaust tube 13, and a "hot" exhaust tube 14, the latter comprising merely an extension of the tube 11. The tube 11 is preferably several diameters long, some authorities recommending that the tube be as much as 50 diameters in length. It has been found, however, that such an extreme ratio of length to diameter is not critical to successful operation.

The inlet conduit 12 is preferably on the order of one-tenth the diameter of the tube 11. The cold exhaust tube 13 is preferably on the order of 20% to 50% of the diameter of the tube 11, and preferably terminates at its inner end immediately adjacent the inlet end of the tube 11. In an alternative construction, the cold exhaust tube 13 may extend axially into the tube 11 through the hot exhaust end thereof. If desired, a spiral fin, not shown, may extend a short distance radially inwardly of the tube 11 to induce a smoother, less turbulent vortex.

Since vortex tubes and the characteristics thereof as applied to heat pumping are well known in the art and since the particular form of the vortex tube has no particular bearing on the present invention, it is not described in further detail herein.

In accordance with the present invention, the vortex tube 10 is employed as a separator rather than for heat pumping, in which latter function the vortex tube is well known. Where the device is employed to cleanse a gas which is laden with foreign particulate matter, conventional peripheral velocities of the vortex within the vortex tube suffice to produce substantial cleansing of a substantial portion of the gas, the cleansed gas exhausting through the cold exhaust tube 13 and the particle-laden gas exhausting through the hot exhaust tube 14. This is true even though the particulate matter is substantially of molecular size. It has been found, for example, that a portion of the exhaust gas from an internal combustion engine may be substantially cleansed of lead compounds, such as lead bromide and lead chloride, which appear in substantial quantities in such exhaust gases, even though very low pressures, and hence low peripheral velocities within the vortex, are employed. In general, particulate matter is heavier than the gas which is to be cleansed, and will be thrown radially outwardly such that it is carried out of the vortex tube with the hot gas through the hot exhaust tube 14, the gas which exits through the cold exhaust pipe 13 being substantially cleansed of particulate matter.

It is known that a vortex tube will operate properly (without collapse of the vortex) when the flow through the cold exhaust tube comprises from one-third to one-half of the total incoming flow. Where the particulate matter is in small concentration in the incoming gas, the cold exhaust flow may approach the higher of these values and still be substantially cleansed of particulate matter.

In an application wherein it is desired that a maximum quantity of cleansed gas be recovered or wherein a heavy concentration of the particulate matter is desired, the particle-laden hot exhaust gas may be run through one or more additional cleansing steps. In each cleansing step, more cleansed gas is removed through the cold exhaust, and the particulate matter is correspondingly concentrated in a smaller residue of the original gas exiting through the hot exhaust pipe. In an application wherein a quantity of gas is desired which is of highest possible cleanness, the cold exhaust of the first vortex tube may be run through one or more additional cleansing steps. It has been found, however, that the cold exhaust from a single vortex tube is quite free of particulate matter, even under adverse conditions wherein the incoming gas is heavily laden with small, light, particulate matter.

The ultimate disposition of the cleansed gas and the concentrated, particle-laden gas depends, of course, on the application of the invention. By way of example only, where the particulate matter is of value or has detrimental characteristics and therefore must be collected, the particle-laden gas may be passed through suitable filters, settling enclosures, or conventional cyclone separators. In any such example, it will be seen that use of the present invention will reduce the necessary size of the associated separator, with little attendant cost.

Where the device is employed to separate gases of different molecular weights, high peripheral velocity of the vortex within the vortex tube is desired. Depending upon the degree of separation desired and on the difference in molecular weights of the gases, the peripheral speed of the vortex may desirably be on the order of 100 miles per hour or several hundred miles per hour. These high peripheral velocities of the vortex are necessary because of the basic difficulty of separating gases by centrifuging. One factor working against the separation of gases by this method is, of course, the tendency of gases to diffuse.

Many applications of the invention involving the separation of gases will be immediately apparent to those skilled in the art. By way of example only, one application of the invention is to the separation of helium from natural gas. At the present time this is accomplished by cooling natural gas to a temperature at which all of the heavier hydro-carbon gases condense to liquid form, after which the gaseous helium may be separated therefrom. This process is, of course, quite expensive, whereby any action which increases the effectiveness of the process may result in very substantial savings. If, for example, the concentration of helium in natural gas can be raised from 1.0% to 1.1%, the processing of a given quantity of natural gas will produce 10% more helium.

In accordance with one basic form of the invention, helium concentration may be increased in this magnitude. Using peripheral speeds on the order of several hundred miles per hour, a vortex tube may receive natural gas containing 1% helium and produce a cold exhaust stream containing on the order of 1.1% helium and a hot exhaust stream containing on the order of .9% helium. The cold exhaust may then be treated in the above-discussed manner to produce 10% more helium than would be obtained in the treatment of an equal quantity of straight natural gas.

It will be appreciated that large quantities of helium will be lost in the hot exhaust, but this is of no consequence in this application since only a small quantity of natural gas is treated for helium recovery in any event. A similar situation exists in many other applications of the invention.

Another application of the invention is to the separation of methane $CH_4$ and ethane $C_2H_6$. Again, it is desirable that very high peripheral velocities be effected. Methane, being the lighter gas, will appear in increased concentration in the cold exhaust, and ethane will appear in increased concentration in the hot exhaust of the vortex tube. The concentration of these gases will, however, be found to be insufficient to be of substantial commercial value, at least without further separation means.

Figure 3:
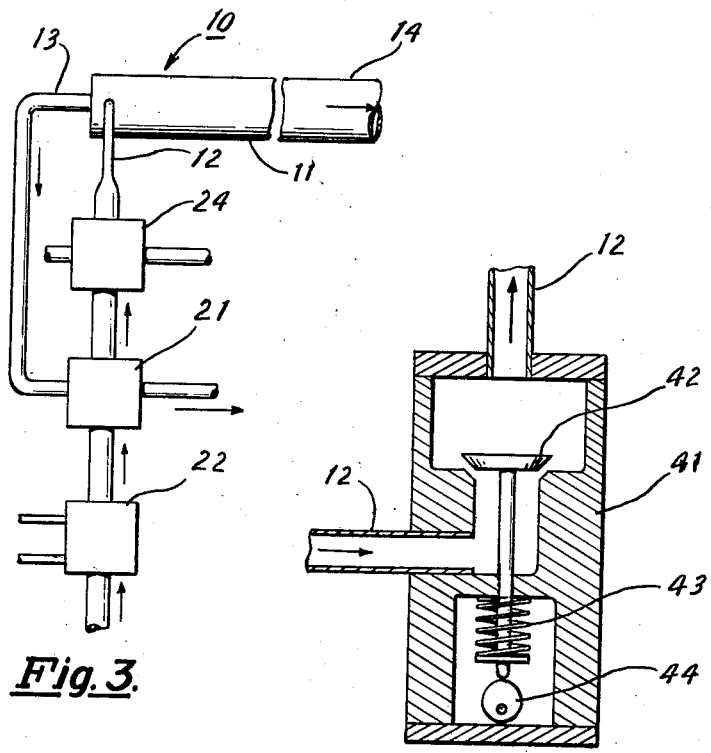
FIGURE 3 is a diagrammatic illustration of a modified form of the invention whereby gases of different molecular weights may be separated with a high degree of effectiveness through utilization of both the centrifuging effect and the heat pumping effect of the vortex tube of FIGS. 1 and 2.

It is well known that the separation effect of a centrifuge device is increased by lowering the temperature of the gases, the effect varying approximately inversely with the absolute temperature. Accordingly, one method of increasing the separation factor is to utilize the reduced temperature of the cold exhaust to reduce the temperature of the incoming gas. This is illustrated in FIG. 3 wherein the cold exhaust pipe 13 of the vortex tube 10 directs the cold exhaust to a heat exchanger 21 through which the cold exhaust cools the incoming gases.

This feature of the invention is particularly effective where high peripheral velocity of the vortex, and hence a high inlet pressure, is required. In such case, the gas must be compressed before being directed into the vortex tube, its temperature thereby being raised substantially. The pressurized gas may be cooled to a very substantial extent by the cold exhaust stream through the heat exchanger 21. When the inlet gas expands within the vortex tube it is cooled by such expansion to a temperature considerably below that of the original gas before compression. This effect may be increased by first cooling the compressed gas through a simple water cooled heat exchanger 22.

In accordance with this last described modification, the invention employs both the centrifuging effect and the heat pump effect of the vortex tube. In accordance with a further modification of the invention, the heat pump effect of the vortex tube is utilized even more directly, within the vortex tube, to increase the separation effect. This is accomplished by utilizing the cooling of the gas in the central portion of the vortex to cause selective condensation thereof.

In accordance with this modification of the invention, the gas as it is received within the vortex tube 10 from the inlet tube 12 is maintained at a temperature above the boiling temperature of the higher boiling temperature gas but sufficiently close thereto that any of the higher boiling temperature gas that is brought near the center of the vortex will be condensed. The condensed gas droplets, because of their great density as compared to the surrounding gas, will be thrown quickly to the outer portion of the vortex.

In the example of separating methane and ethane, the latter is the heavier gas and has the higher boiling temperature, this being −88.3° C. The incoming gas is preferably cooled to a temperature on the order of −50°

C. or lower, although a higher temperature may be permissible. The temperature of incoming gas referred to is, of course, the temperature of the gas as it enters the vortex tube. The temperature of pressurized gas feeding the inlet tube 12 may be substantially higher, according to its pressure.

Cooling of the inlet gas may be accomplished in part by the heat exchangers 21 and 22 of FIG. 3, previously referred to. A further heat exhanger 24 is also shown, adjacent the vortex tube 10, for further cooling of the inlet gas. Liquid $CO_2$ may be employed in this final cooling stage.

Vortex tubes commonly produces temperature differences between hot and cold exhaust streams of 100° C., and as much as 200° C. Where a 100° C. differential is obtained, this consists of a 50° C. or greater differential between cold exhaust and inlet streams, and a 50° C. or smaller differential between hot exhaust and inlet streams, depending upon the relative magnitudes of the hot and cold exhaust streams. Where methane and ethane enter the vortex tube 10 at a temperature of −50° C., the gas near the center of the vortex will tend to fall to −100° C. or colder, a temperature well below the boiling temperature of ethane. Accordingly, any ethane near the center of the vortex will condense into droplets which will quickly be thrown to the outer portion of the vortex because of their great density.

Since the heat released by condensation of ethane raises the temperature of the remaining gas as the central portion of the vortex, it is necessary that the gas at the inner portion of the vortex tend toward a temperature substantially below the boiling temperature of the ethane,, as suggested above.

According to this modification fo the invention, partial separation of the two gases is accomplished first by the centrifuging effect of the vortex tube, this being augmented by combined condensing of one gas through the heat pump effect of the tube and increased centrifuging effect resulting from the great relative density of the condensed gas droplets. It will now be seen that this modification of the invention employs, within the vortex tube, cooperation of the centrifuging effect and the heat pump effect of the vortex tube to accomplish separation of gases of different molecular weights.

In this application of the invention, as in others, the separation process may be repeated in series steps where a greater concentration of either the methane or ethane is desired. Where a greater concentration of the lighter gas is required the cold exhaust may be re-treated, and where a greater concentration of the heavier gas is required, the hot exhaust may be re-treated.

It will be appreciated that the above described embodiments of the invention, providing cooling of the inlet gas, with or without condensation of the heavier gas within the vortex tube, are adapted to various applications including, for example, the separation of helium from natural gas. Where condensation of the higher boiling temperature gas is effected and the gases which are to be separated are characterized by the lighter gas having the higher boiling temperature, the effect of the condensation of the lighter gas and subsequent centrifuging of the condensed particles, will, in most application, greatly outweigh the centrifuging effect of the materials in their gaseous form, whereby a concentration of the lighter gas may be withdrawn through the hot exhaust tube and a concentration of the heavier gas may be withdrawn through the cold exhaust tube.

Figure 4:
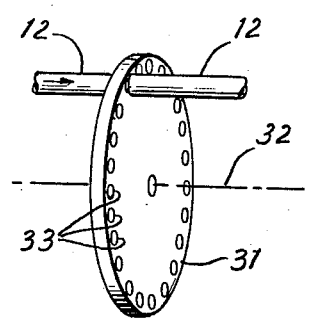
FIGURE 4 is a schematic representation of a device which may be employed in cooperation with a relatively low pressure source of gas to increase the peripheral vortex speeds within a vortex tube; and, FIGURE 5 is a cross-sectional view of an automatically operating poppet valve which may be employed for the same purpose as the device of FIG. 4.
Figure 5:
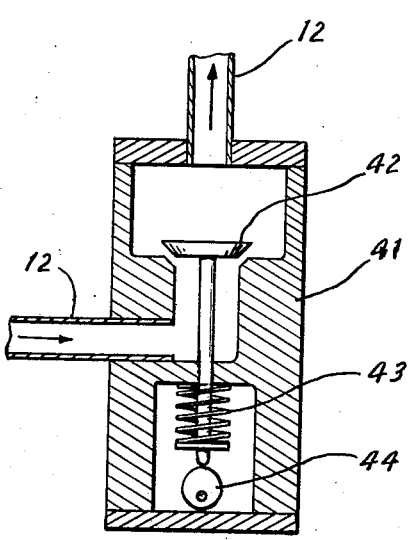

The apparatus illustrated in FIGS. 4 and 5 serve to increase peripheral vortex speeds, and are particularly useful where gas is available at limited pressure. In FIG. 4, a disk 31 is arranged to interesect the path of gas flowing through the inlet tube 12, the tube being discontinuous to permit interjecting of the disk. The disk is rotatable about an axis 32 and has a series of openings 33 therein which are arranged to pass across the path of the gas as it flows through the tube 12.

It will be seen that if the disk 31 is made to rotate, gas flow through the inlet tube 12 and into the vortex tube 11 will be intermittent. Rotation of the disk 31 may be effected by external drive means, or the edges of the openings 33 may be beveled to permit rotation of the disk by the gas flow. The facing ends of the tube 12 should, of course, be closely adjacent the opposed surfaces of the disk to minimize leakage. Where desired, the disk may be enclosed such that gas which escapes between the disk and the pipe ends is trapped, and ultimately finds its way into the downstream portion of the inlet tube 12.

The rotating disk, by momentarily interrupting the flow of gas, permits the building up of inlet pressure whereby greater peripheral speed of the vortex may be attained than would be possible with a constant flow of gas. Even where the gas source is of the constant pressure type, greater peripheral velocity of the vortex will still be obtained, since momentary interruption of gas flow will, in any case, reduce back pressure. While the apparatus of FIG. 4 may be considered as being of particular value where initial pressure is of limited magnitude, it may be of value as a means of increasing peripheral vortex velocity regardless of the available inlet pressure.

In FIG. 5 a poppet valve is shown incorporated in the inlet tube 12. The valve includes a casing 41, a valve 42, and a spring 43 which biases the valve 42 toward closed position. The valve is repeatedly opened by a rotating eccentric cam 44 and is closed by the spring 43. Operation of the valve in this manner makes gas flow intermittent within the inlet tube. It will be apparent that the valve of FIG. 5 may serve the same function as the rotating disk of FIG. 4, namely that of increasing peripheral vortex velocity with a given available gas pressure.

A method and apparatus have now been disclosed for separating solid particles from a gas and for separating two gases of different molecular weights. It will be apparent to those skilled in the art that the invention has various other applications. It may, for example, be employed in separating liquids, or separating a liquid from particulate solids. In separating gases or liquids, it will be appreciated, of course, that a mixture of several gases or liquids of various molecular weights or densities may be separated into two groups, according to their weights or densities.

As will be apparent from the above description, the term "separate" as employed herein is meant to be interpreted as including partial separation, or concentration, as well as substantially complete separation. In the separation of gases, a relatively slight concentration of one gas in a mixture of two or more gases may, as indicated above, be of very substantial value.

Because of the fact that gas passes rapidly through the vortex tube 10 and out of the cold and hot exhaust tubes 13 and 14 it will be appreciated that a vortex tube of small size may handle a substantial flow of gas, even where moderate pressures and peripheral speeds are used. Furthermore, both the heavier and lighter materials are continuously exhausted, whereby the method and apparatus operate in a genuinely continuous manner.

The apparatus is obviously simple and economical in construction and reliable in operation, no moving parts being employed except in the form of the optional pulsating devices of FIGS. 4 and 5.

While there has been described what is at present considered to be the preferred embodiments of the invention, it will be understood that various modifications may be made therein, and it is intended to cover in the appended claims all such modifications as fall within the true spirit and scope of the invention.

The invention having thus been described, what is claimed and desired to be secured by Letters Patent is:

1. The method of separating a gas from a mixture of said gas and a heavier constituent of gaseous, liquid or solid particulate form which comprises directing a stream of said mixture generally tangentially into a vortex tube, withdrawing a concentration of the lighter, gaseous constituent of said mixture through a passage opening to the radially central portion of said vortex tube, withdrawing a concentration of the heavier constituent through a passage opening to the radially outer portion of said vortex tube, and cyclically interrupting the flow of said stream of said mixture whereby back pressure resisting flow of said stream is repeatedly relieved.

2. Apparatus for separating a gas from a mixture of said gas and a heavier constituent of gaseous, liquid or solid particulate form comprising a vortex tube having an inlet tube for directing a stream of said mixture generally tangentially into said vortex tube, a cold exhaust tube for withdrawing a concentration of the lighter, gaseous constituent of said mixture, a hot exhaust tube for withdrawing a concentration of the heavier constituent of said mixture, and means for cyclically interrupting the flow of said stream of said mixture, whereby back pressure resisting flow of said stream is repeatedly relieved.

3. The separation apparatus specified in claim 2 wherein said interrupting means comprises a rotatable member extending into an interruption in said inlet tube and having a plurality of spaced apart openings successively aligned with said inlet tube as said member rotates.

4. The separation apparatus of claim 3 wherein said openings in said rotatable member are bevelled such that said stream of said mixture may cause rotation of said member.

5. The separation apparatus specified in claim 2 wherein said interrupting means comprises a valve interposed in said inlet tube and having means for cyclically opening and closing said valve.

References Cited in the file of this patent

UNITED STATES PATENTS

| | | |
|---|---|---|
| 2,203,874 | Ohl | June 11, 1940 |
| 2,581,168 | Bramley | Jan. 1, 1952 |
| 2,670,756 | Granberg | Mar. 2, 1954 |
| 2,677,391 | Chellberg | May 4, 1954 |
| 2,683,972 | Atkinson | July 20, 1954 |
| 2,698,525 | Lindenblad | Jan. 4, 1955 |
| 2,708,834 | Dodge | May 24, 1955 |
| 2,741,899 | Von Linde | Apr. 17, 1956 |
| 2,869,924 | McGill | Jan. 20, 1959 |
| 2,894,371 | Auer et al. | July 14, 1959 |
| 2,904,965 | Green | Sept. 22, 1959 |
| 2,907,174 | Hendal | Oct. 6, 1959 |
| 2,958,202 | Green | Nov. 1, 1960 |
| 2,961,004 | Aldinger et al. | Nov. 22, 1960 |
| 2,971,342 | Pilcher | Feb. 14, 1961 |